United States Patent
Otsu et al.

(10) Patent No.: US 11,718,922 B2
(45) Date of Patent: Aug. 8, 2023

(54) LAMINATED STRUCTURE INCLUDING ELECTRODES

(71) Applicant: DE NORA PERMELEC LTD, Kanagawa (JP)

(72) Inventors: Hideo Otsu, Kanagawa (JP); Kota Kuroki, Kanagawa (JP)

(73) Assignee: DE NORA PERMELEC LTD, Kanagawa (JP)

( * ) Notice: Subject to any disclaimer, the term of this patent is extended or adjusted under 35 U.S.C. 154(b) by 0 days.

(21) Appl. No.: 17/753,904

(22) PCT Filed: Sep. 25, 2019

(86) PCT No.: PCT/JP2019/037496
§ 371 (c)(1),
(2) Date: Mar. 17, 2022

(87) PCT Pub. No.: WO2021/059379
PCT Pub. Date: Apr. 1, 2021

(65) Prior Publication Data
US 2022/0416262 A1    Dec. 29, 2022

(51) Int. Cl.
*C25B 13/02*    (2006.01)
*C25B 9/77*    (2021.01)
(Continued)

(52) U.S. Cl.
CPC ............... *C25B 9/77* (2021.01); *C25B 1/04* (2013.01); *C25B 9/75* (2021.01); *H01M 8/188* (2013.01)

(58) Field of Classification Search
CPC ... C25B 9/77; C25B 9/75; C25B 1/04; H01M 8/188
See application file for complete search history.

(56) References Cited

U.S. PATENT DOCUMENTS

| 4,332,661 A | 6/1982 | Ford et al. |
| 4,368,109 A | 1/1983 | Ford |

(Continued)

FOREIGN PATENT DOCUMENTS

| EA | 025913 B1 | 2/2017 |
| EP | 0121611 A2 | 10/1984 |

(Continued)

OTHER PUBLICATIONS

Search Report for International Application No. PCT/JP2019/037496 dated Dec. 17, 2019, pp. 1-5 (including English translation).

(Continued)

*Primary Examiner* — Zulmariam Mendez
(74) *Attorney, Agent, or Firm* — Pearne & Gordon LLP (57) ABSTRACT

[Problem] To provide a stacked structure including electrodes that can effectively prevent misalignment between units. [Solution] A stacked structure 2 including electrodes 232, 332, 412, 233, 333, 422, wherein multiple units 23, 33, 24, 41, 42 including flat units are stacked and fastened by fasteners 25, the respective units 23, 33, 24, 41, 42 comprising frame-shaped fastening portions 237a, 237b, 337a, 337b, 247a, 247b, 417a, 417b, 427a, 427b on outer peripheral portions on both surfaces thereof, being stacked by the surfaces of the respective fastening portions 237a, 237b, 337a, 337b, 247a, 247b, 417a, 417b, 427a, 427b being pressed against each other, and being formed so that the width of fastening portions 247a, 247b, 337a, 337b, 427a, 427b on one unit is different from the width of fastening portions 237a, 237b, 417a, 417b on another unit.

9 Claims, 9 Drawing Sheets (51) Int. Cl.
    *C25B 9/75*         (2021.01)
    *C25B 1/04*         (2021.01)
    *H01M 8/18*       (2006.01)

(56) References Cited

U.S. PATENT DOCUMENTS

| | | |
|---|---|---|
| 4,391,680 A | 7/1983 | Mani et al. |
| 4,431,502 A | 2/1984 | Ford |
| 4,441,977 A | 4/1984 | Ford |
| 4,602,984 A | 7/1986 | Beaver et al. |
| 4,758,322 A | 7/1988 | Sioli |
| 2008/0105540 A1 | 5/2008 | Federico et al. |
| 2015/0167188 A1 | 6/2015 | Hoormann et al. |
| 2018/0358633 A1 | 12/2018 | Kanno |

FOREIGN PATENT DOCUMENTS

| | | |
|---|---|---|
| JP | S5351440 U | 5/1978 |
| JP | S57108281 A | 7/1982 |
| JP | S5976565 A | 5/1984 |
| JP | S609109 B2 | 3/1985 |
| JP | S6110555 B2 | 3/1986 |
| JP | S621236 Y2 | 1/1987 |
| JP | S6221873 B2 | 5/1987 |
| JP | H0661970 U | 9/1994 |
| JP | H0949096 A | 2/1997 |
| RU | 2360040 C1 | 6/2009 |
| WO | 2018066093 A1 | 4/2018 |
| WO | 2018092215 A1 | 5/2018 |

OTHER PUBLICATIONS

Decision to Grant a Patent for Japanese Pat. Appl. No. 2020-536822, dated Oct. 13, 2020, pp. 1-5 (including English translation).
Extended European Search Report for European Application No. 19946605.3 dated Nov. 4, 2022 (19 pages).

PRIOR ART

LAMINATED STRUCTURE INCLUDING ELECTRODES

TECHNICAL FIELD

The present invention relates to a stacked structure including electrodes.

BACKGROUND

In order to construct electrolytic cells for electrolysis, redox flow batteries, and the like, stacked structures in which multiple units including electrodes are stacked and spaces between the units are filled with a solution are used.

Patent Document 1 discloses an apparatus for electrolysis in a solution. A stacked structure in which multiple bipolar elements are connected by rods is described.

Patent Document 2 discloses a redox flow battery in which multiple battery cells including anodes and cathodes are stacked. Said document describes that the multiple battery cells are arranged between two end plates, and the stacked state is held by means of nuts and bolts.

CITATION LIST

Patent Literature

Patent Document 1: U.S. Pat. No. 4,758,322 B
Patent Document 2: WO 2018/092215 A1
Patent Document 3: JP H9-49096 A

SUMMARY OF INVENTION

Technical Problem

As described in Patent Documents 1 and 2, in order to construct stacked structures composed of multiple units, components (fasteners) for physically pressing the units against each other, such as rods or nuts and bolts, are used. The multiple units that are stacked are not bonded by means of an adhesive or welding, and are held by the frictional forces between the units. Thus, such holding mechanisms always carry the risk of the units becoming misaligned. Additionally, when a three-chambered electrolytic cell as indicated in Patent Document 3 is constructed from a stacked structure, an intermediate chamber (middle chamber) is further added to the unit being constructed. Thus, the number of constituent units increases to approximately twice the number in comparison to a two-chambered electrolytic cell that is composed of a cathode chamber and an anode chamber. Increasing the number of constituent units raises the probability that the units will become misaligned. Additionally, in order to improve the throughput of manufactured goods or to ensure stable operation, the electrode areas must be made somewhat large, which in turn causes the unit areas to become large and increases the mass that must be held, thus adversely affecting unit misalignment prevention even further.

The present invention was made in consideration of such problems, and a problem to be solved by the present invention is to provide a stacked structure including electrodes that can effectively prevent misalignment between units.

Solution to Problem

In order to solve the above-mentioned problem, the present invention employs the means indicated below.

Namely, the stacked structure according to the present invention is a stacked structure including electrodes, wherein multiple units including flat units are stacked and fastened by fasteners, the respective units comprising frame-shaped fastening portions on outer peripheral portions on both surfaces thereof, being stacked by the surfaces of the respective fastening portions being pressed against each other, and being formed so that the width of fastening portions on one unit is different from the width of fastening portions on another unit.

Due to this configuration, misalignment between the units can be prevented.

In one embodiment of the present invention, the fastening portions comprise, on front surface sides thereof, gaskets comprising elastic members.

Due to this configuration, the present invention can be constructed from appropriate components.

In one embodiment of the present invention, diaphragms are provided between the stacked units, and the diaphragms are interposed between the fastening portions of the respective units.

In one embodiment of the present invention, the multiple units include a bipolar element and a middle chamber.

In one embodiment of the present invention, the multiple units are formed by stacking multiple sets of unit stacks wherein each set, as a single unit, is constructed by stacking, in the following order, a bipolar element, a middle chamber, and a bipolar element.

In one embodiment of the present invention, the multiple units are bipolar elements.

In one embodiment of the present invention, the multiple units include a cathode unit and an anode unit.

Due to a configuration such as those of the above-mentioned embodiments, the present invention can be appropriately implemented.

Effects of Invention

According to the present invention, a stacked structure including electrodes that can effectively prevent misalignment between units can be provided.

DESCRIPTION OF EMBODIMENTS

Hereinafter, embodiments of the present invention will be explained in detail with reference to the drawings.

First Embodiment

Figure 1:
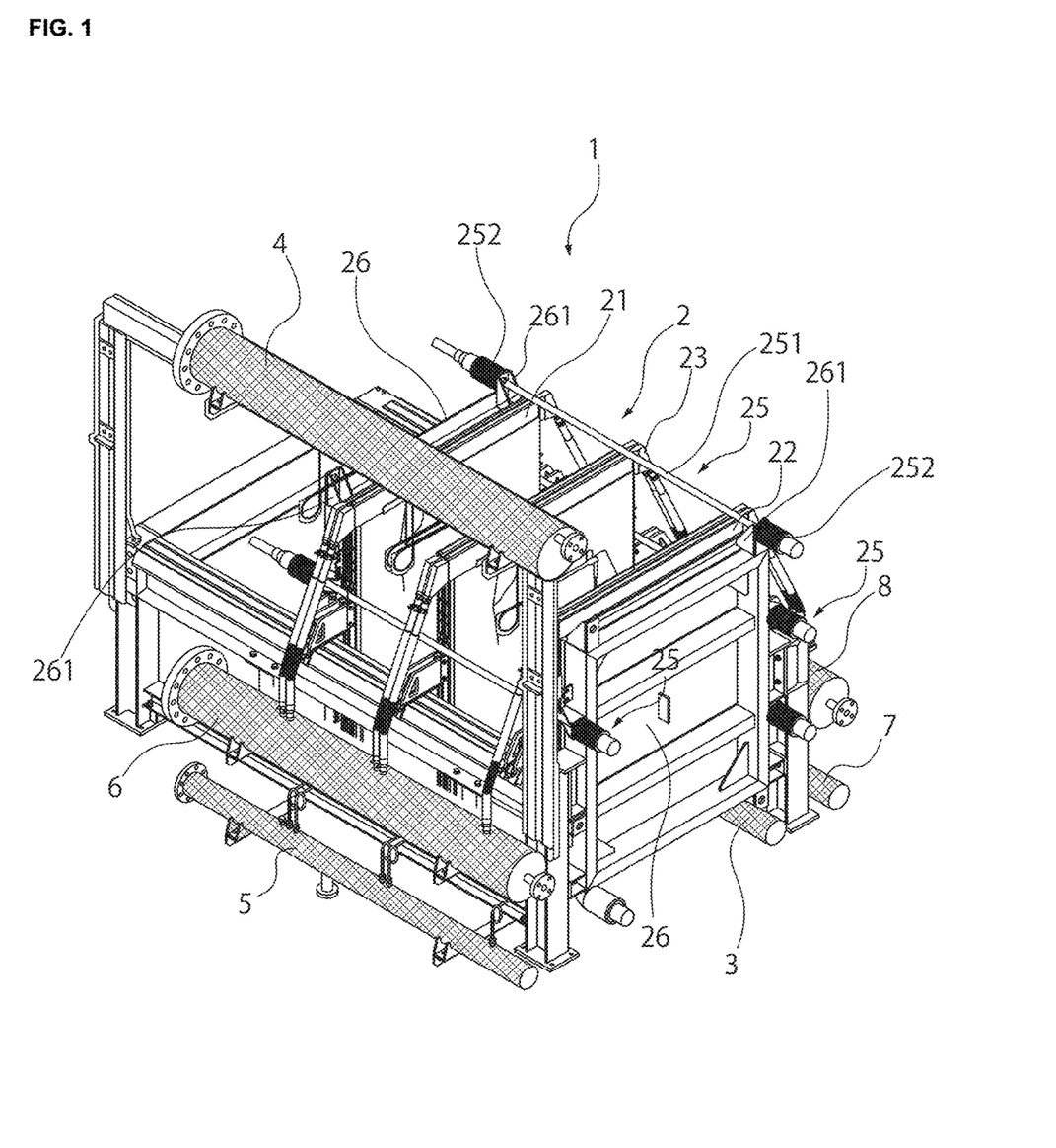
FIG. 1 is a perspective view of an electrolytic cell comprising a stacked structure including electrodes according to an embodiment of the present invention.

Hereinafter, an example of an embodiment of the present invention will be indicated. FIG. 1 is a perspective view of an electrolytic cell 1 comprising a stacked structure including electrodes according to an embodiment of the present invention. The electrolytic cell 1 comprises: a stacked structure 2 including electrodes; a middle chamber supply manifold 3; a middle chamber discharge manifold 4; a cathode chamber supply manifold 5; a cathode chamber discharge manifold 6; an anode chamber supply manifold 7; and an anode chamber discharge manifold 8.

The stacked structure 2 comprises fasteners 25 and a pair of terminal support frames 26, a terminal cathode element 21, a terminal anode element 22, and arranged therebetween, multiple bipolar elements 23 (flat units comprising electrodes), of which only two are illustrated in FIG. 1, and multiple middle chambers, which are not illustrated in FIG. 1. The terminal cathode element 21 and the terminal anode element 22 are arranged between the pair of terminal support frames 26. The fasteners 25 are composed of rods 251 and nuts 252.

The terminal support frames 26 are provided with support members 261 for supporting the rods 251 of the fasteners 25, and are configured so that the rods 251 are inserted through holes formed in the support members 261, nuts 252 are screwed onto both ends of the rods 251, and the terminal cathode element 21, the terminal anode element 22, the multiple bipolar elements 23, and the multiple middle chambers, which are arranged between the pair of terminal support frames 26, are clamped from both ends. All of these components together form the stacked structure 2.

Figure 2:
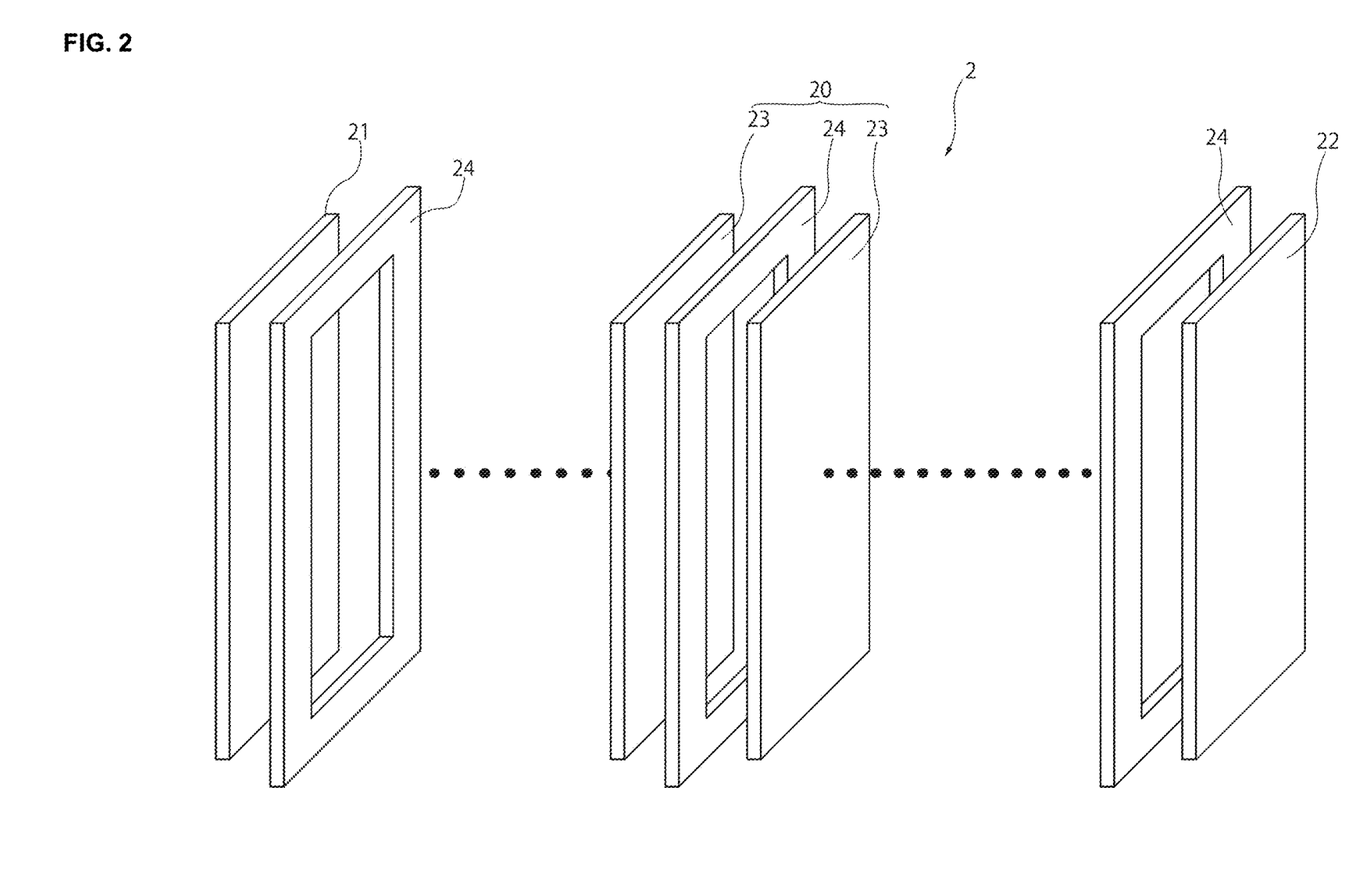
FIG. 2 is a schematic diagram for explaining the positional relationship between units in a stacked structure according to an embodiment of the present invention.

FIG. 2 is a schematic diagram for explaining the positional relationship between the terminal cathode element 21, the terminal anode element 22, and the bipolar elements 23 and the middle chambers 24 that are arranged therebetween in the stacked structure 2. The stacked structure 2 is formed by stacking multiple sets of unit stacks 20 wherein each set, as a single unit, is constructed by stacking, in the following order, a bipolar element 23, a middle chamber 24, and a bipolar element 23. Additionally, in the stacked structure 2, in order to allow the structures of the terminal portions, in the stacking direction, to form an electrolytic cell 1 without conflicting with each other, middle chambers 24 are arranged, respectively, on the inner sides, in the stacking direction, of the terminal cathode element 21 and the terminal anode element 22.

Figure 3:
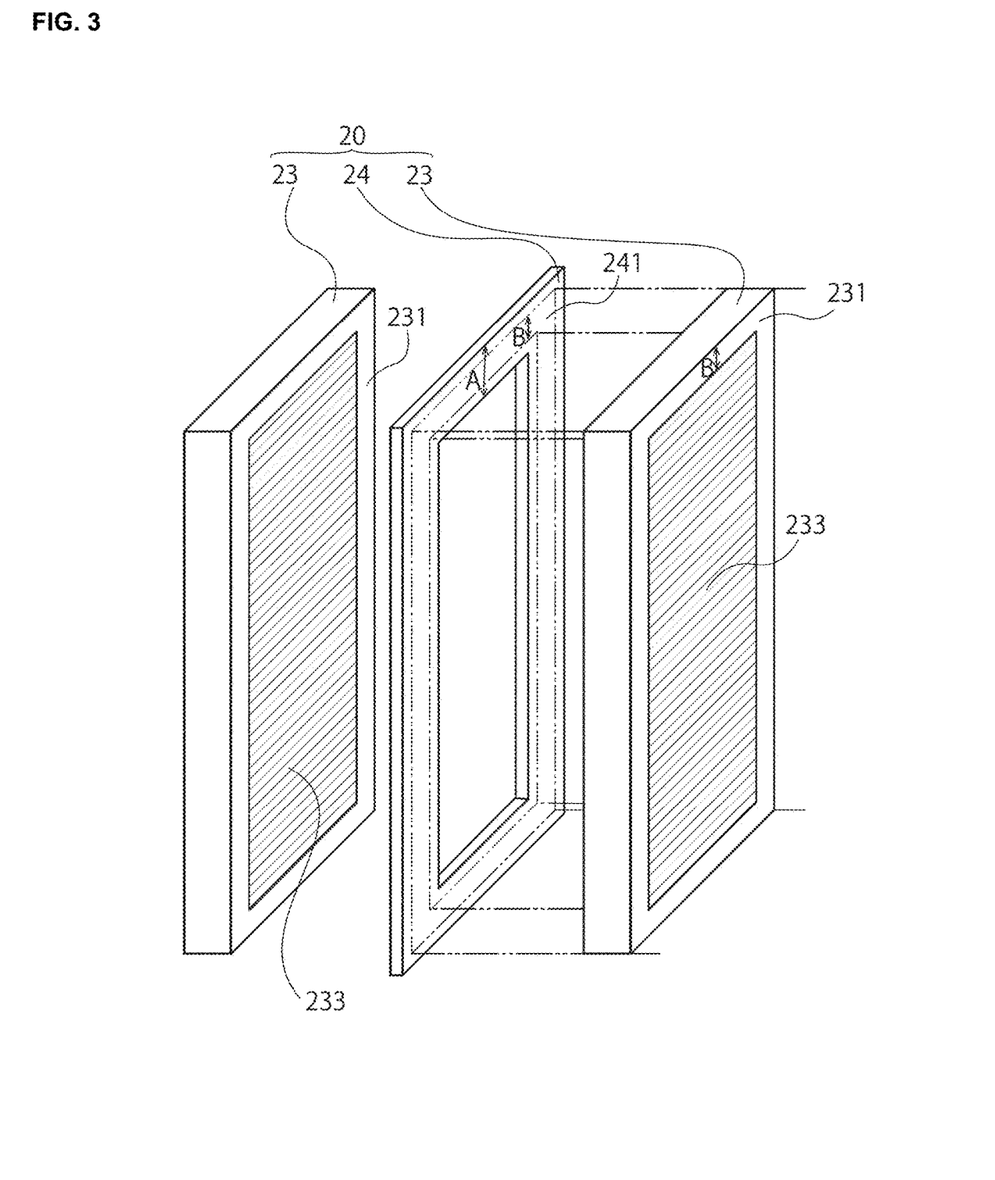
FIG. 3 is a schematic perspective view indicating the positional relationship and configuration of a unit stack according to an embodiment of the present invention.
Figure 4:
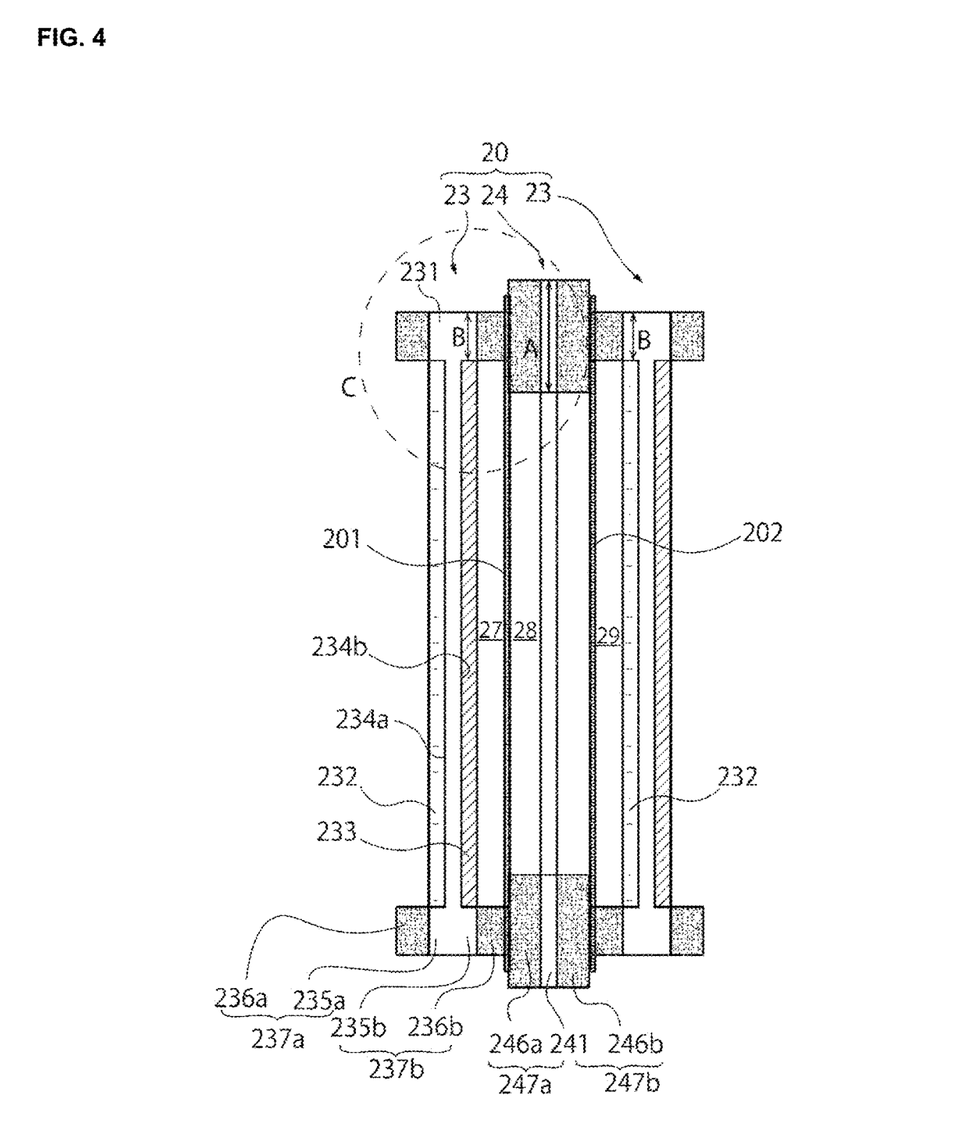
FIG. 4 is a vertical section view of a unit stack according to an embodiment of the present invention.

FIG. 3 is a perspective view illustrating the positional relationship between a bipolar element 23, a middle chamber 24, and a bipolar element 23, as mentioned above, in a single unit stack 20, and the respective configurations thereof. FIG. 4 is a vertical section view for the case in which this unit stack 20 has been stacked.

The bipolar elements 23 are composed of a bipolar element body 231, an anode 232, and a cathode 233. The bipolar element body 231 has recesses 234a, 234b formed on the front and rear surfaces thereof, and the edges of these recesses 234a, 234b are frame-shaped protrusions 235a, 235b. The anode 232 is provided inside the recess 234a, and the cathode 233 is provided inside the recess 234b.

Gaskets 236a, 236b comprising elastic members are bonded, respectively, to the surfaces of the protrusions 235a, 235b. The protrusions 235a, 235b and the gaskets 236a, 236b form fastening portions 237a, 237b.

The middle chamber 24 is composed of a middle chamber body 241 and gaskets 246a, 246b bonded to the front and rear surfaces of this middle chamber body 241. The middle chamber body 241 and the gaskets 246a, 246b form the fastening portions 247a, 247b. The middle chamber body 241 is formed so as to be frame-shaped, with a space being formed in the central area thereof.

The middle chamber 24 is located at the center, with diaphragms 201, 202 arranged on both the front and rear surfaces thereof. Furthermore, the bipolar elements 23, 23 are arranged on the outer sides of these diaphragms 201, 202, and these portions are connected to each other to form a single unit stack 20.

In the present embodiment, the diaphragm 201 is a cation exchange membrane and the diaphragm 202 is an anion exchange membrane.

In the above-mentioned configuration, the space between the diaphragm 201 and the cathode 233 of the bipolar element 23 on the left side in FIG. 4 forms a cathode chamber 27, the space between the diaphragm 201 and the diaphragm 202, including the space in the central area of the middle chamber body 241, forms an intermediate chamber 28, and the space between the diaphragm 202 and the anode 232 of the bipolar element on the right side in FIG. 4 forms an anode chamber 29.

The width A of the fastening portions 247a, 247b of the middle chamber 24 is formed to be larger than the width B (so as to be different from the width B) of the fastening portions 237a, 237b of the bipolar elements.

If electrolysis using sodium sulfate ($Na_2SO_4$) as the raw material is to be performed in the electrolytic cell 1 configured as described above, then a sodium hydroxide solution (NaOH) is supplied to the multiple cathode chambers 27 through the cathode chamber supply manifold 5. The multiple middle chambers 28 are supplied with a sodium sulfate solution ($Na_2SO_4$) through the middle chamber supply manifold 3, and the multiple anode chambers 29 are supplied with a sulfuric acid solution ($H_2SO_4$) through the anode chamber supply manifold 7.

When the electrolytic cell 1 is started in a state in which the respective chemical solutions are supplied, a positive voltage is applied to the anode 232 and a negative voltage is applied to the cathode 233. By applying this voltage, the anode 232 becomes anodically polarized and the cathode 233 becomes cathodically polarized. On the surface of the anode 232, water ($H_2O$) is oxidized to generate $H^+$ cations and oxygen ($O_2$), and on the surface of the cathode 233, water ($H_2O$) is reduced to generate $OH^-$ anions and hydrogen ($H_2$).

When this state is reached, in order to maintain electrical neutrality, sulfuric acid ions $SO_4^{2-}$ pass through the anion exchange membrane 202 and move from the middle chamber 28 to the anode chamber 29, and sodium ions $Na^+$ pass through the cation exchange membrane 201 and move from the middle chamber 28 to the cathode chamber 27.

Due to the above-mentioned generation step, oxygen gas ($O_2$) and sulfuric acid ($H_2SO_4$) are generated in the anode chamber 29, and the generated oxygen gas ($O_2$) and sulfuric acid ($H_2SO_4$) are recovered, as products, through the anode chamber discharge manifold 8. In the cathode chamber 27, hydrogen gas ($H_2$) and sodium hydroxide (NaOH) are generated, and the generated hydrogen gas ($H_2$) and sodium hydroxide (NaOH) are recovered, as products, through the cathode chamber discharge manifold 6.

The sodium sulfate solution ($Na_2SO_4$) supplied as the raw material to the middle chamber 28 is recovered through the middle chamber discharge manifold 4 for recycling.

During the above-mentioned generation step, a sodium hydroxide solution (NaOH) is supplied to the cathode chamber 27. However, due to the above-mentioned generation step, a sodium hydroxide solution (NaOH) that is more highly concentrated than the concentration when supplied is obtained in the cathode chamber 27. Some of this sodium hydroxide solution (NaOH) is recovered as a product. Purified water ($H_2O$) is added to the remaining solution, the adjusted-concentration sodium hydroxide solution (NaOH) is resupplied to the cathode chamber 27, and the above-mentioned generation step is repeated.

Next, the functions and effects of the stacked structure 2 provided by the above-mentioned electrolytic cell 1 will be explained.

Figure 5:
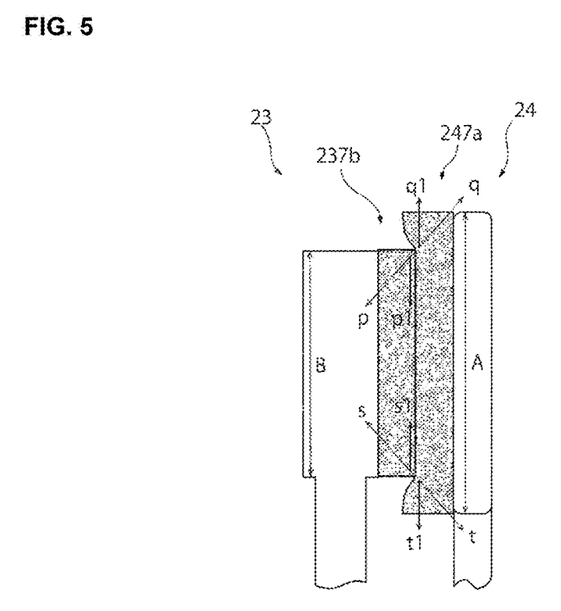
FIG. 5 is an enlarged view of a fastening portion according to an embodiment of the present invention.
Figure 6:
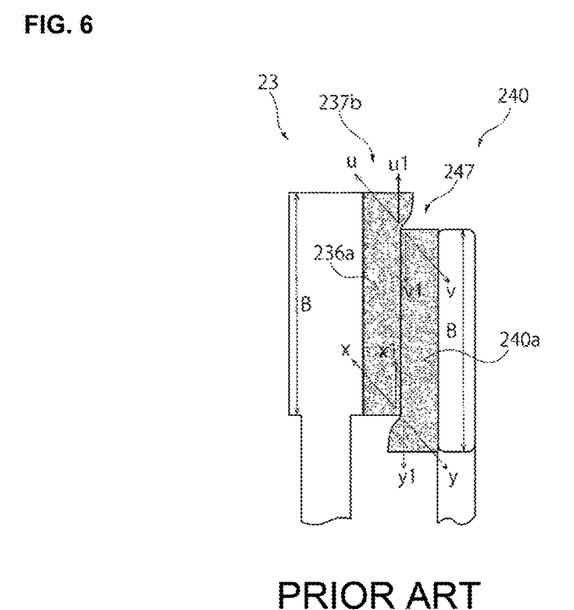
FIG. 6 is an enlarged view of a fastening portion according to the conventional art.

FIG. 5 illustrates an enlarged view of the part indicated by the circle C represented by the dashed lines in FIG. 4, indicating the fastening portion 237b of the bipolar element 23 and the fastening portion 247a of the middle chamber 24. FIG. 6 illustrates an enlarged view of a part corresponding to FIG. 5 according to the conventional art, indicating the fastening portion 237b of the bipolar element 23 and the fastening portion 247 of the middle chamber 240.

In this case, the diaphragms 201, 202 illustrated in FIG. 4 are much thinner than the bipolar element 23 and the middle chamber 24. Thus, when the gaskets 236a, 236b, 246a, 246b of the bipolar element 23 and the middle chamber 24 are pressed together, the diaphragms 201, 202 deform in accordance with the shapes of the gaskets 236a, 236b, 246a, 246b. Therefore, in order to make the explanation easier to understand, the diaphragms 201, 202 in FIG. 4 are omitted from FIG. 5 and FIG. 6.

In this case, as indicated in FIG. 6 illustrating the conventional art, the width B of the fastening portion 237b of the bipolar element 23 and the width B of the fastening portion 247 of the middle chamber 240 are the same. In this configuration, the gaskets 236b, 240a, which have the same width, are brought into contact. Thus, there was a problem in that, if the forces applied to the gasket 236b, 240a were not equal, then these gaskets 236b, 240a could become positionally misaligned with each other, thus not allowing the units to be appropriately fastened.

To explain this point in detail, the gaskets 236b and 240a are formed from elastic members, and therefore, if they are slightly misaligned, then forces corresponding to mutual actions and reactions will act on the ends thereof, as indicated by the arrow u and the arrow v, and by the arrow x and the arrow y. When these forces are separated into the components in the vertical direction (the direction in which the misalignment occurs) on the sheet surface of FIG. 6, it can be seen that forces are generated, respectively in the directions of the arrows u1, v1, x1, y1. At this time, the forces u1 and x1 acting on the bipolar element 23 are in the same direction, and act on the bipolar element 23 as u1+x1. The forces v1 and y1 acting on the middle chamber 240 are in the same direction, opposite to the direction of the force acting on the bipolar element 23, and act on the middle chamber 240 as v1+y1. Therefore, the actions of the force u1+x1 and the force v1+y1 increase the forces working to move the bipolar element 23 upward on the sheet surface and to move the middle chamber 240 downward on the sheet surface, thereby causing further and further misalignment.

In contrast therewith, in FIG. 5, the width A of the fastening portion 247a of the middle chamber 24 is formed to be larger than the width B of the fastening portion 237b of the bipolar element 23. The forces corresponding to the actions and reactions acting in this case are represented by the arrows p, q, s, t, and are represented by being separated into p1, q1, s1, t1 as components in the misalignment direction. The forces p1 and s1 acting on the fastening portion 237b of the bipolar element 23 are in opposite directions and therefore cancel out. The forces q1 and t1 acting on the fastening portion 247a of the middle chamber 24 are also in opposite directions and therefore cancel out. As a result thereof, forces are not generated in the misalignment direction. Even if slight misalignment occurs for some reason, as long as the fastening portion 237b remains within the width A of the fastening portion 247a, the forces will act in the same manner as mentioned above, and no forces will be generated in the misalignment direction.

As mentioned above, in the present embodiment, the fastening portions 247a, 247b of the middle chamber 24 are formed to be wider than the fastening portions 237a, 237b of the bipolar element 23. Thus, the forces in the misalignment direction cancel out and are not generated. Additionally, even if there is a slight misalignment, as long as the fastening portion 247a of the middle chamber 24 remains within the width B of the fastening portion 237b of the bipolar element 23, forces will not be generated in the misalignment direction. Therefore, it is possible to provide a stacked structure 2 including electrodes in which misalignment of the units (the bipolar elements 23 and the middle chambers 24) can be prevented effectively.

Second Embodiment

Figure 7:
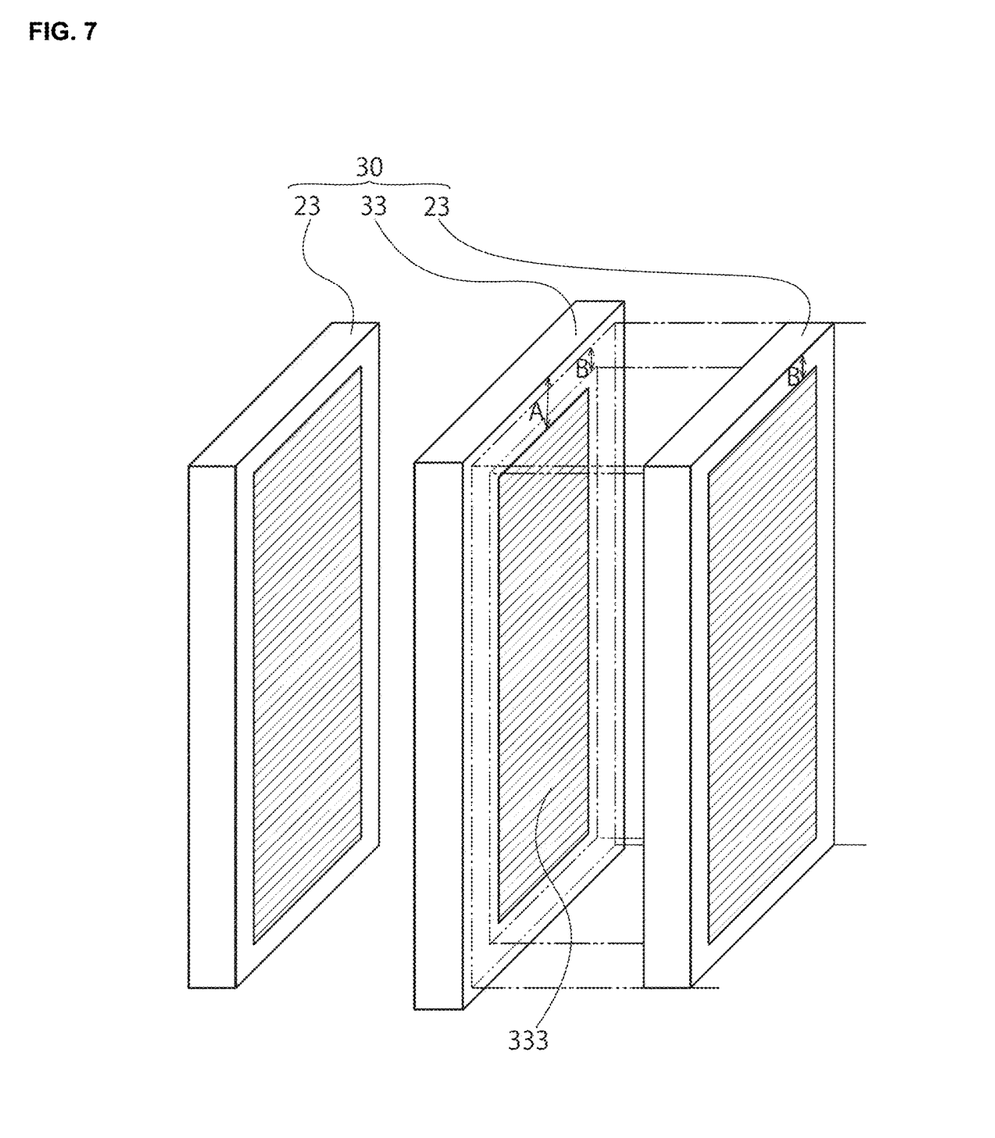
FIG. 7 is a schematic perspective view indicating the positional relationship and configuration of a unit stack according to an embodiment of the present invention.
Figure 8:
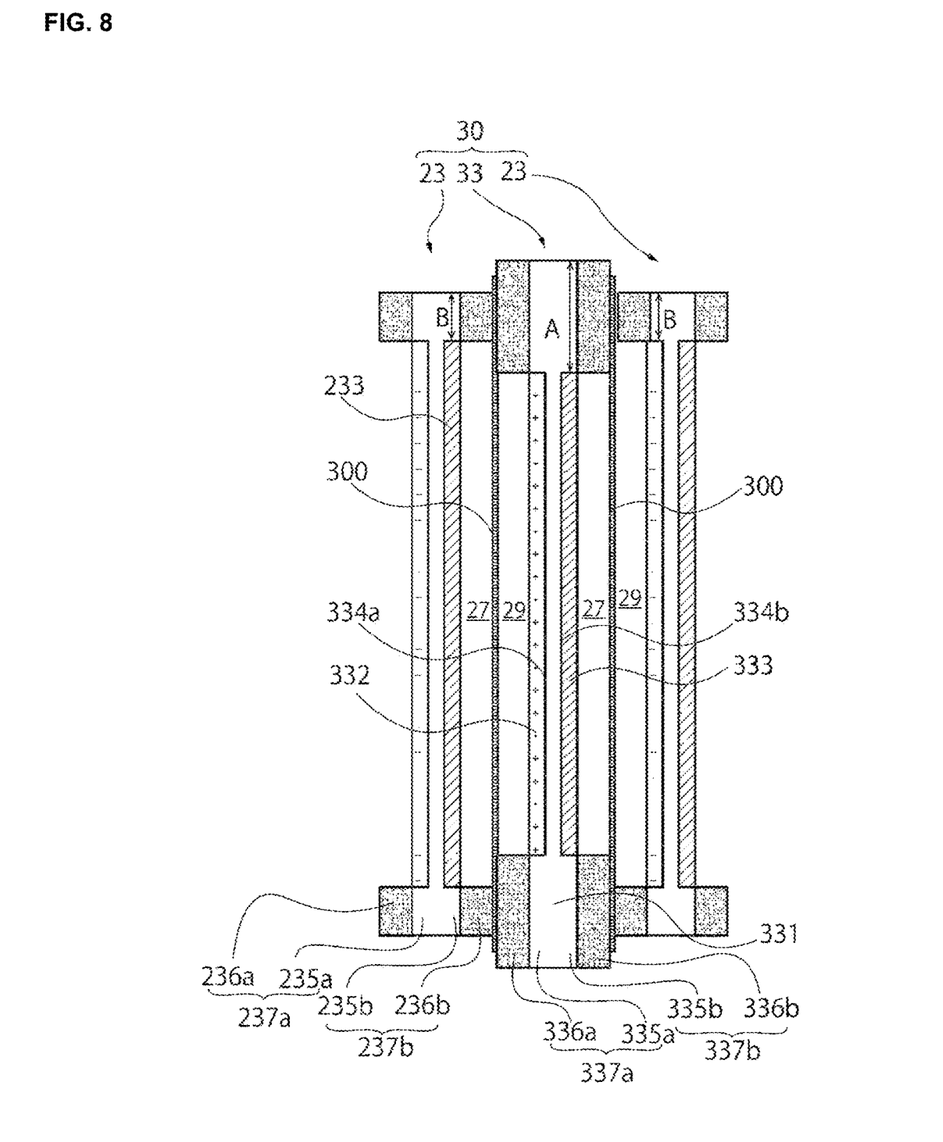
FIG. 8 is a vertical section view of a unit stack according to an embodiment of the present invention.

FIG. 7 is a perspective view of a unit stack 30 according to a second embodiment of the present invention. FIG. 8 is a section view of the unit stack 30 of the present embodiment. Regarding the present embodiment, the differences from the first embodiment will be explained, and the features that are identical will be assigned the same reference numbers and the explanations thereof will be omitted.

The unit stack 30 in the present embodiment comprises bipolar elements 23 having the same structure as in the first embodiment, and a bipolar element 33 on which the width of fastening portions 337a, 337b is different from the width of the fastening portions 237a, 237b of the bipolar elements 23, with the structures otherwise being the same. The unit stack 30 is constructed from a set consisting of a bipolar element 23, a bipolar element 33, and a bipolar element 23.

The bipolar element 33 is composed of a bipolar element body 331, an anode 332, and a cathode 333. The bipolar element body 331 has recesses 334a, 334b formed on the front and rear surfaces thereof, and the edges of these recesses 334a, 334b are frame-shaped protrusions 335a, 335b. The anode 332 is provided inside the recess 334a, and the cathode 333 is provided inside the recess 334b.

Gaskets 336a, 336b comprising elastic members are bonded, respectively, to the surfaces of the protrusions 335a, 335b. The protrusions 335a, 335b and the gaskets 336a, 336b form fastening portions 337a, 337b.

The width A of the fastening portions 337a, 337b of the bipolar element 33 is formed to be larger than the width B of the fastening portions 237a, 237b of the bipolar element 23.

Diaphragms 300 are provided between the bipolar elements 23 and the bipolar element 33, and in the present embodiment, the diaphragms 300 are cation exchange membranes.

The space between the diaphragm 300 and the cathode 233 of the bipolar element 23 on the left side in FIG. 8 forms a cathode chamber 27, and the space between the diaphragm 300 and the anode 332 of the bipolar element 33 forms an anode chamber 29.

In the present embodiment, a sodium hydroxide solution (NaOH) is supplied to the cathode chamber 27, and a sodium sulfate ($Na_2SO_4$) solution is supplied to the anode chamber 29. When a positive voltage is applied to the anode and a negative voltage is applied to the cathode in a state in which the chemical solutions are supplied, the anode 332 becomes anodically polarized and the cathode 233 becomes cathodically polarized. On the surface of the anode 332, water ($H_2O$) is oxidized to generate $H^+$ cations and oxygen ($O_2$), and on the surface of the cathode 233, water ($H_2O$) is reduced to generate $OH^-$ anions and hydrogen ($H_2$).

When this state is reached, in order to maintain electrical neutrality, the $Na^+$ cations in the anode chamber 29 pass through the cation exchange membrane (diaphragm) 300 and move to the cathode chamber 27, and oxygen gas ($O_2$) and sulfuric acid ($H_2SO_4$) are generated in the anode chamber 29. In the cathode chamber 27, in which the remaining raw material, sodium sulfate ($Na_2SO_4$), is in a state of mixture with these products, sodium hydroxide (NaOH) and hydrogen gas ($H_2$) are generated. The respective products are recovered through discharge manifolds, which are not illustrated.

In the present embodiment, the width A of the fastening portions 337a, 337b of the bipolar element 33 is formed to be larger than the width B of the fastening portions 237a, 237b of the bipolar elements 23. Thus, functions and effects similar to those in the first embodiment can be obtained.

Third Embodiment

Figure 9:
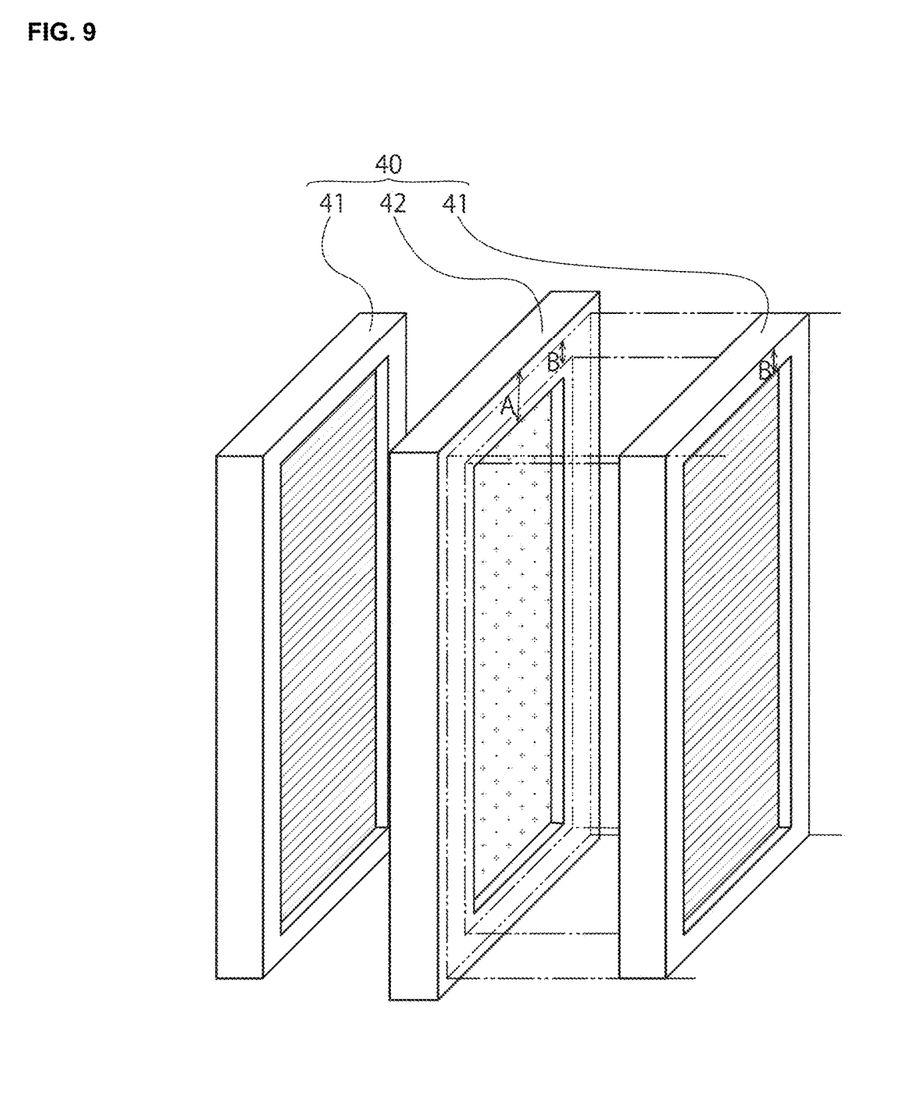
FIG. 9 is a schematic perspective view indicating the positional relationship and configuration of a unit stack according to an embodiment of the present invention.
Figure 10:
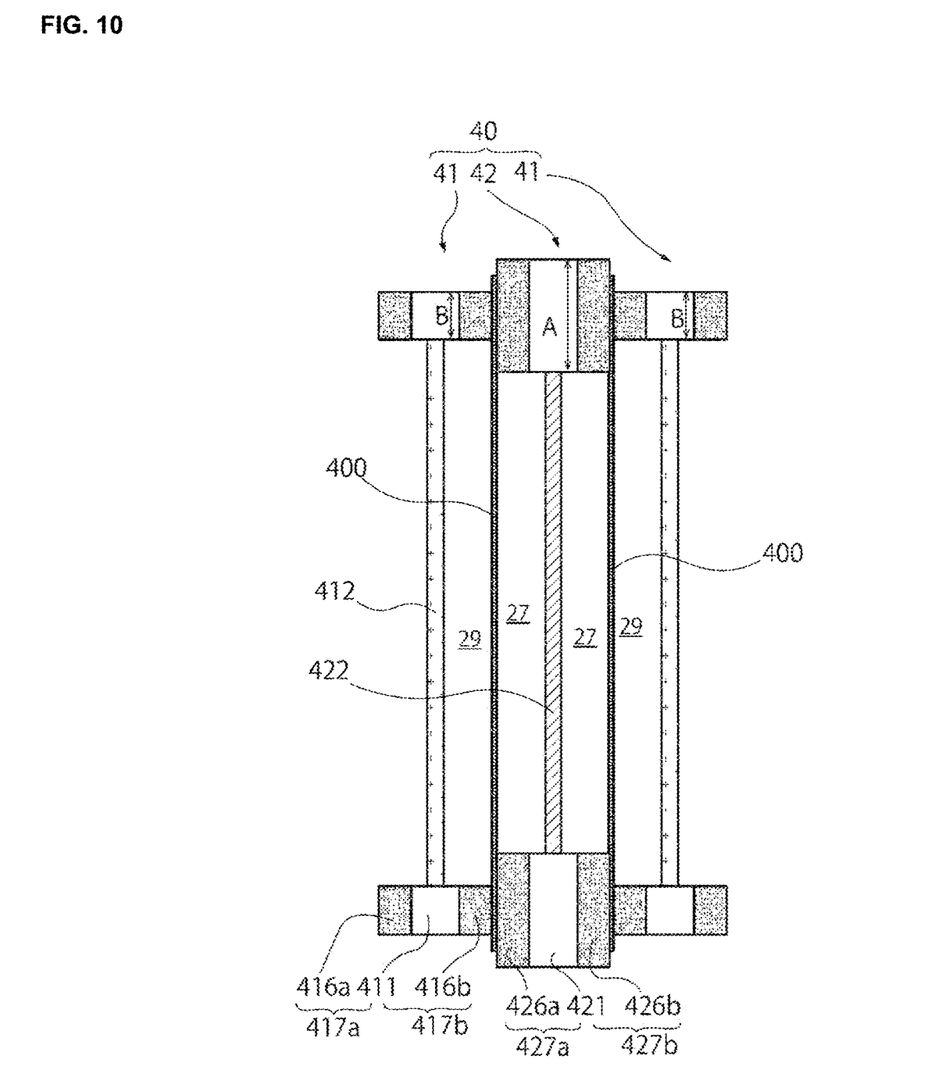
FIG. 10 is a vertical section view of a unit stack according to an embodiment of the present invention.

FIG. 9 is a perspective view of a unit stack 40 according to a third embodiment of the present invention. FIG. 10 is a section view of the unit stack 40 of the present embodiment. Regarding the present embodiment, the differences from the first embodiment will be explained, and the features that are identical will be assigned the same reference numbers and the explanations thereof will be omitted.

The unit stack 40 in the present embodiment comprises anode units 41 and a cathode unit 42. The unit stack 40 is constructed from a set consisting of an anode unit 41, a cathode unit 42, and an anode unit 41.

The anode units 41 are composed of a frame-shaped anode unit body 411 and an anode 412. The anode unit body 411 has the anode 412 fitted in the interior thereof.

Gaskets 416a, 416b comprising elastic members are bonded, respectively, to the surfaces of the anode unit bodies 411. The anode unit bodies 411 and the gaskets 416a, 416b form fastening portions 417a, 417b.

The cathode unit 42 is composed of a frame-shaped cathode unit body 421 and a cathode 422. The cathode unit body 421 has the anode 422 fitted in the interior thereof.

Gaskets 426a, 426b each comprising elastic members are bonded to the surface of the cathode unit body 421. The cathode unit body 421 and the gaskets 426a, 426b form fastening portions 427a, 427b.

The width A of the fastening portions 427a, 427b of the cathode unit 42 is formed to be larger than the width B of the fastening portions 417a, 417b of the cathode unit 42.

Diaphragms 400 are provided between the anode units 41 and the cathode unit 42. In the present embodiment, the diaphragms 400 are cation exchange membranes.

The spaces between the diaphragms 400 and the cathode 422 of the cathode unit 42 form cathode chambers 27, and the spaces between the diaphragm 400 and the anodes 412 of the bipolar elements 41 form anode chambers 29.

Since the operations of the electrolytic cell due to electrolysis in the cathode chambers 27 and the anode chambers 29 are the same as those in the second embodiment, the explanation will be omitted here.

In the present embodiment, the width A of the fastening portions 427a, 427b of the cathode unit 42 is formed to be larger than the width B of the fastening portions 417a, 417b of the anode units 41. Thus, functions and effects similar to those in the first embodiment can be obtained.

In the above-mentioned embodiments, the generation of sodium hydroxide (NaOH) in the electrolytic cells was explained. However, the invention is not limited thereto. For example, by supplying lithium sulfate ($Li_2SO_4$) to the intermediate chamber 28 in the case of the first embodiment and to the cathode chambers 27 in the case of the second and third embodiments, and supplying lithium hydroxide NOM to the cathode chambers 27, lithium hydroxide NOM and hydrogen ($H_2$) can be generated in the cathode chambers 27 by electrolysis. That is, all electrolytic cells having the stacked structure of the present invention are included in the present invention, regardless of the products generated thereby. Additionally, the present invention is not limited to electrolytic cells, and for example, batteries, electrodialysis devices, and the like are also included in the present invention, as long as they have the stacked structure of the present invention.

Additionally, the differences in the widths of the fastening portions in the above-mentioned embodiments are not limited to those described in the embodiments mentioned above. It is sufficient for the widths of the fastening portions to be such that the width of a fastening portion of one of the units that is to be stacked is different from that of the other. For example, in the first embodiment, the width of the fastening portions of the bipolar elements 33 may be made larger than the width of the middle chamber. In the third embodiment, the width of the fastening portions of the anode units 41 may be made larger than the width of the fastening portions of the cathode unit 42.

REFERENCE SIGNS LIST

2 Stacked structure
20, 30, 40 Unit stack
23, 33 Bipolar element (unit)
232, 332, 412 Anode
233, 333, 422 Cathode
236a, 236b, 336a, 336b Gasket of bipolar element
237a, 237b, 337a, 337b Fastening portion of bipolar element
24, 240 Middle chamber (unit)
247a, 247b, 247 Fastening portion of middle chamber
25 Fastener
41 Anode unit (unit)
416a, 416b Gasket of anode unit
417a, 417b Fastening portion of anode unit
42 Cathode unit (unit)
426a, 426b Gasket of anode unit
427a, 427b Fastening portion of anode unit
201, 202, 300, 400 Diaphragm

The invention claimed is:

1. A stacked structure including electrodes, wherein multiple units including flat units are stacked and fastened by fasteners,
the respective units comprising frame-shaped fastening portions on outer peripheral portions on both surfaces thereof, being stacked by the surfaces of the respective fastening portions being pressed against each other, and being formed so that a width of fastening portions on one unit is different from a width of fastening portions on another unit;
the fastening portions comprising, on front surface sides thereof, gaskets comprising elastic members; and
outer edge portions on a side on which the width of the fastening portions is smaller being located further to the inside than outer edge portions on a side on which the width is larger, and inner edge portions on the side on which the width of the fastening portions is smaller being located further to the inside than inner edge portions on the side on which the width is larger.

2. The stacked structure including electrodes according to claim 1, wherein diaphragms are provided between the stacked units, and the diaphragms are interposed between the fastening portions of the respective units.

3. The stacked structure including electrodes according to claim 1, wherein the multiple units include a bipolar element and a middle chamber.

4. The stacked structure including electrodes according to claim 3, wherein the multiple units are formed by stacking multiple sets of unit stacks wherein each set, as a single unit, is constructed by stacking, in the following order, a bipolar element, a middle chamber, and a bipolar element.

5. The stacked structure including electrodes according to claim 1, wherein the multiple units are bipolar elements.

6. The stacked structure including electrodes according to claim 1, wherein the multiple units include a cathode unit and an anode unit.

7. The stacked structure including electrodes according to claim 2, wherein the multiple units include a bipolar element and a middle chamber.

8. The stacked structure including electrodes according to claim 2, wherein the multiple units are bipolar elements.

9. The stacked structure including electrodes according to claim 2, wherein the multiple units include a cathode unit and an anode unit.

* * * * *